July 2, 1935.  H. C. PORTER  2,007,002
STRETCHING TOOL
Filed Aug. 18, 1932   3 Sheets-Sheet 1
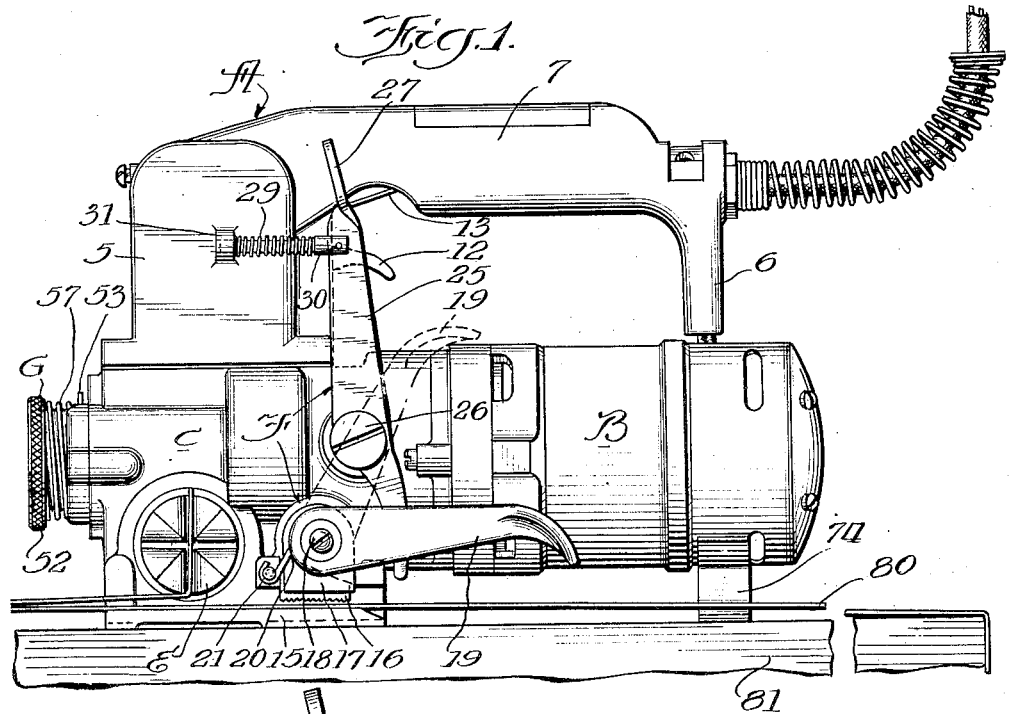
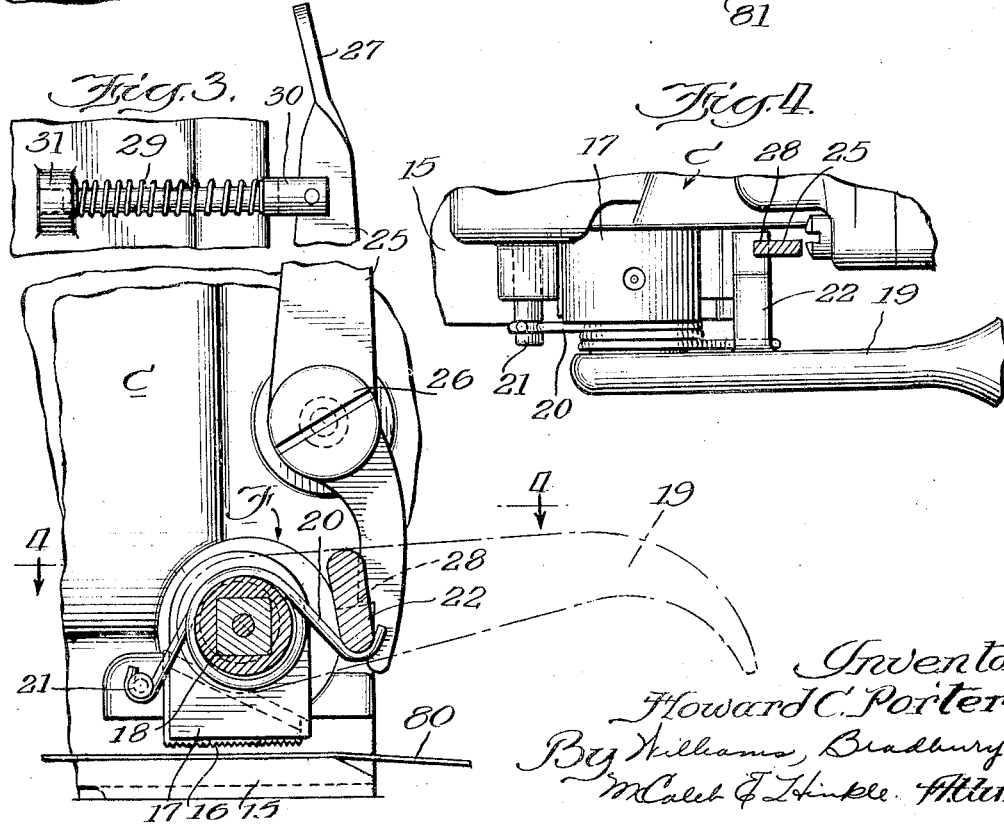
Inventor
Howard C. Porter July 2, 1935.  H. C. PORTER  2,007,002
STRETCHING TOOL
Filed Aug. 18, 1932  3 Sheets-Sheet 2
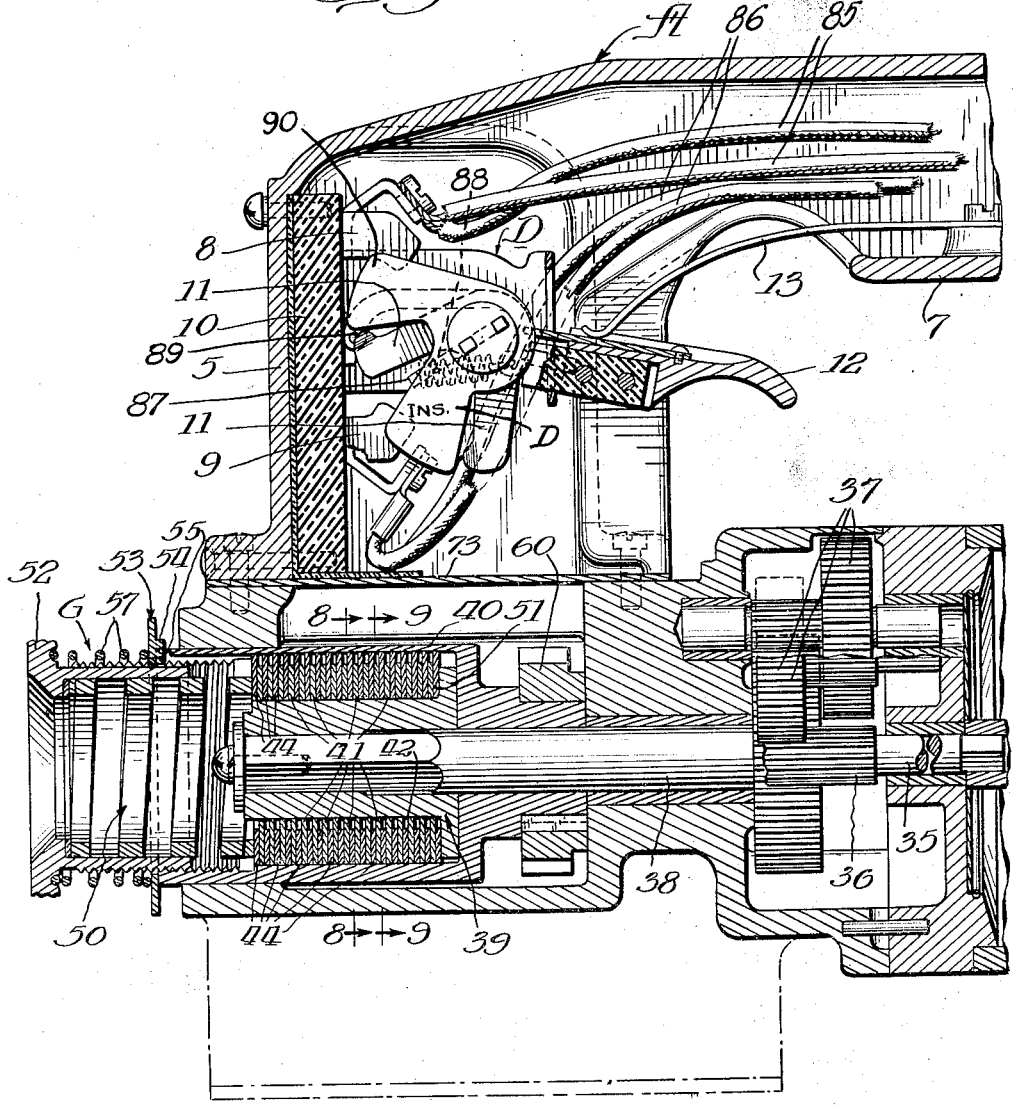
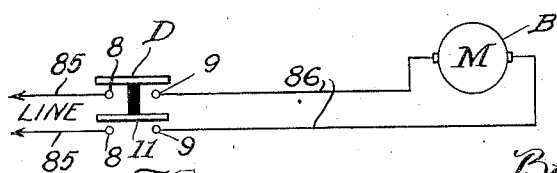

July 2, 1935.                     H. C. PORTER                      2,007,002
                                 STRETCHING TOOL
                              Filed Aug. 18, 1932            3 Sheets-Sheet 3
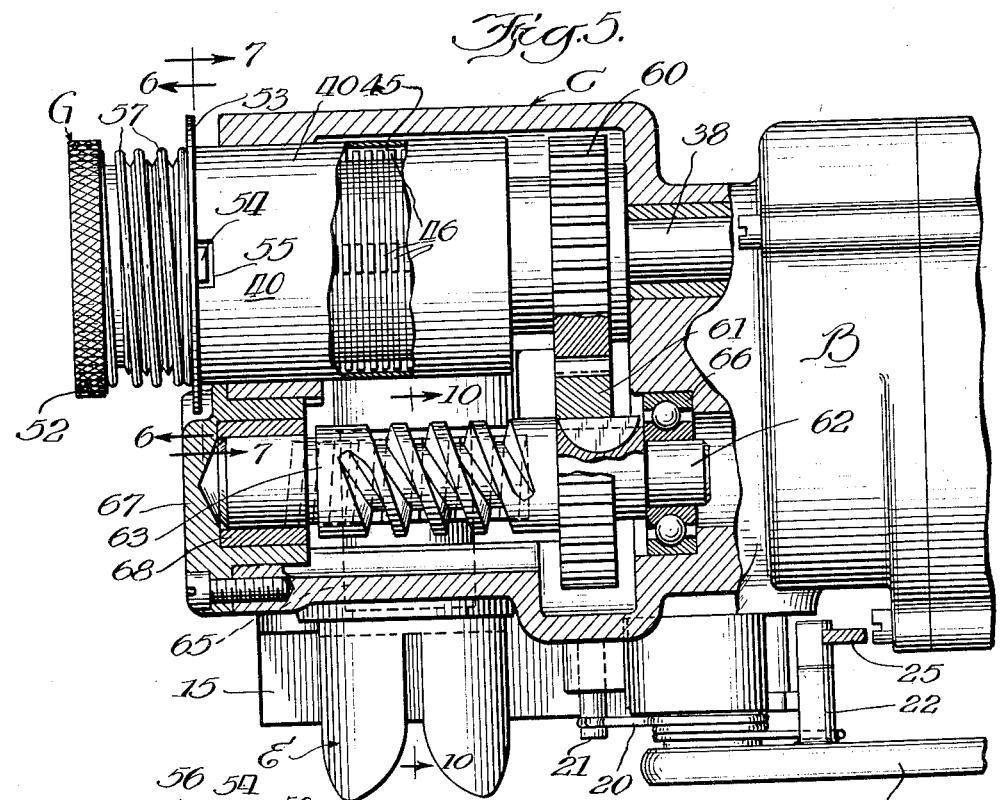
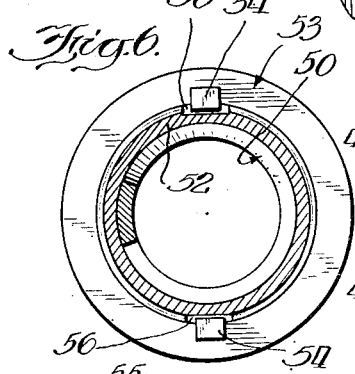
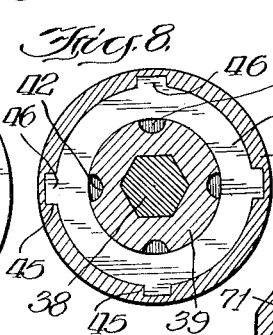
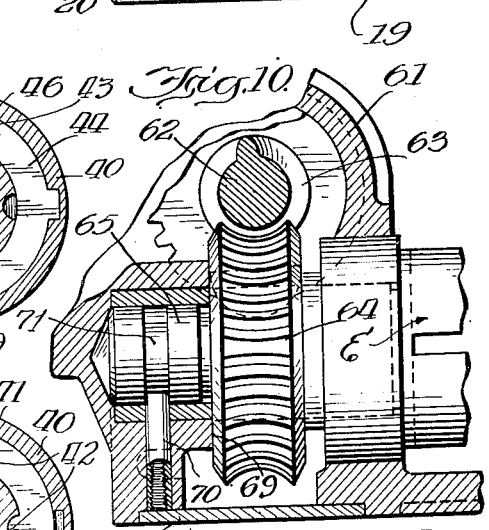
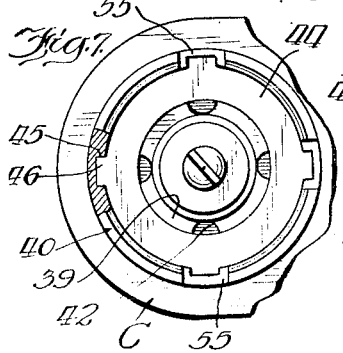
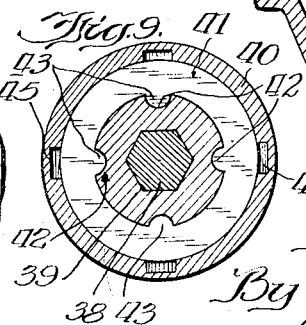
Inventor:
Howard C. Porter Patented July 2, 1935

2,007,002

UNITED STATES PATENT OFFICE 2,007,002

STRETCHING TOOL

Howard C. Porter, La Grange Park, Ill., assignor to Signode Steel Strapping Company, Chicago, Ill., a corporation of Delaware Application August 18, 1932, Serial No. 629,272

9 Claims. (Cl. 254—51)

My invention relates to so-called "stretching tools" intended for use in tensioning flexible metal binders about packages and groups of packages to secure or bind the same together or to serve as a reinforcement therefor. More particularly the invention relates to a motor driven portable stretching tool.

One of the objects of my invention is to reduce the manual effort required with portable tools to tension binders about packages or groups of packages.

Another object is to reduce the time required to tension binders.

Another object is to provide higher tension than is readily attainable by manual effort.

A further object is to provide a portable motor driven tool which will exert a predetermined tension and thereby prevent breakage of binders and insure substantially equal tension in a plurality of binders about a package or group of packages.

Another object is to provide a tool wherein the amount of predetermined tension may be quickly and easily varied as desired.

Another object is to provide a motor driven tool wherein the tension may be readily released should occasion require.

A further object is to provide a motor driven portable tool wherein the stationary gripper for anchoring one end of the binder may be brought into action by the hand holding the tool, leaving the other hand of the operator free to manipulate the binder.

Another object is to provide a tool which will operate rapidly while the binder tension is low and exert high torque at low speeds,—thereby saving time in taking up slack in the binder and also being capable of exerting maximum effort as the binder tightens.

A further object is to provide a motor driven tool which is compact, reliable and light enough to be readily portable.

Other objects and advantages will hereinafter appear.

An embodiment of my invention is illustrated in the accompanying drawings wherein, Fig. 1 is a side elevation of the tool;

Fig. 2 is an enlarged vertical section through the head of the tool;

Fig. 3 is an enlarged side elevation of the stationary gripper control mechanism;

Fig. 4 is a horizontal section on the line 4—4 of Fig. 3;

Fig. 5 is an enlarged horizontal section through the head of the tool;

Fig. 6 is a section on the line 6—6 of Fig. 5;

Fig. 7 is a section on the line 7—7 of Fig. 5;

Fig. 8 is a section on the line 8—8 of Fig. 2;

Fig. 9 is a section on the line 9—9 of Fig. 2;

Fig. 10 is a section on the line 10—10 of Fig. 5; and

Fig. 11 is a wiring diagram.

In general the tool comprises a handle A which suspends and supports a motor B and a head C and houses a motor control switch D. Head C carries a slotted binder tensioning windlass E, gripper mechanism F for anchoring one end of the binder and a tension adjuster G; it also houses the necessary speed reducing gearing and an adjustable clutch for completing and interrupting the drive connection between the motor and the windlass.

The handle comprises a substantially U-shaped hollow casting, the forward leg 5 of which is enlarged to form a box for the switch mechanism and the rear leg 6 of which extends toward but need not be connected to the motor to form a protective housing for the wires to the motor. The intermediate section 7 of the handle constitutes a housing for the wires and a grip for carrying and manipulating the tool.

The motor which I prefer to use is of the series universal type. Such a motor not only permits the tool to be used upon either A. C. or D. C. but increases its torque as the speed decreases. Thus the effort which can be exerted increases as the tension in the binder approaches its maximum while the maximum speed is available for take-up when the binder tension is low.

It is preferred to employ a switch D which makes and breaks the circuit at four points simultaneously so as to reduce arcing to a minimum. The incoming conductor leads are designated 85 while the leads from the switch to the motor are designated 86. The pair of leads 85 are secured to the switch contacts 8, one being supplied to each of these contacts. It may here be remarked that the switch structure shown in Fig. 2 shows one stationary switch 8 and one stationary switch contact 9. As will readily be understood with reference to Fig. 11, these elements are duplicated in the switch and the movable contact member 11, which is adapted to bridge between the contacts 8 and 9, is also duplicated so that the circuit is completed or interrupted at four points simultaneously. The contacts 8 and 9 are mounted upon a base 10 of insulating material. The double-bladed contact members 11 are pivotally mounted and carry between them a stirrup member 87. This stirrup member is rigid with the contact members 11 so as to move therewith. The stirrup member is connected by a spring 88 to a trigger element 12. This trigger element is pivotally mounted on the base of the switch at 89. Displacement of the trigger 12 in the upward direction, as viewed in Fig. 2, carries the spring 88 past the pivotal center of the contact members 11, with the result that these contact members 11 snap quickly into circuit-making position. When the trigger member 12 is moved downwardly into the position shown in Fig. 2, the spring 88 is again moved past the pivotal center of the contact members 11 with the result that these members snap out of contact-making position and move into the position shown in Fig. 2.

It must be understood that any convenient type of switch which makes or breaks the current may be used. The type of switch which has just been described is preferred because the current being interrupted at four points minimizes arcing. To further minimize arcing, it is preferred to provide on either side of each contact member 11, sheets of insulating material 90 which are so located that each end of each contact member 11 is followed, as it moves away from its stationary contact 8 or 9 as the case may be, by strips of insulation which immediately kill any arc which may have been formed.

Trigger 12 is positioned adjacent the forward end of the handle grip and immediately below the same so as to be readily accessible to the first finger of the operator's hand holding the tool. In the arrangement shown the raising of the trigger closes the motor circuit and the circuit remains closed until the trigger is released. When the trigger is released a spring 13 returns it to normal position with the result that the motor circuit is interrupted.

The stationary gripper includes a foot 15, which projects laterally from the head frame to underlie the binder, and a movable gripper block 16 adapted to be moved toward and from the foot to clamp the binder therebetween and to provide sufficient separation for receiving the binder. The specific type of movable gripper block and its mounting forms no part of my present invention and may be varied as desired. The particular arrangement chosen for illustration is fully explained in my copending application Serial No. 622,439, filed July 14, 1932, now Patent No. 1,917,663, granted July 11, 1933. For the purpose of this explanation it is sufficient to say that the gripper block 16 is carried by a mounting block 17 which is eccentrically mounted upon a stud shaft 18 projecting from the head frame. Shaft 18 is rotatable by a handle 19 to elevate and lower the mounting block and its gripper. A spring 20, which encircles the gripper mounting block shaft and has one end fixed to a stationary pin 21 while the other end engages a lug 22 on handle 19, serves to bias the handle toward gripping position,—i. e., the elevated position shown by the dotted lines of Fig. 1. Thus when the gripper control handle is free it automatically assumes its elevated or gripping position, forcing the movable gripper block toward the stationary foot to clamp the binder therebetween.

In order normally to hold the gripper out of clamping position and yet to effect its easy release when desired a retaining and trip lever 25 is provided. This lever is pivotally mounted to the head frame by a screw 26 and is provided at its upper end with a thumb piece 27 which lies in proximity to the motor switch control trigger so that it may be operated easily by the thumb of the same hand as that holding the tool and controlling its operation. The opposite end of lever 25 is provided with a tooth 28 which cooperates with the flattened end of lug 22 on the gripper handle to serve as a latch to hold the gripper handle down in non-clamping position against the tension of spring 20. A spring 29 surrounding a plunger 30 which is carried by lever 25 and slides through a hole in a lug 31 on the head frame, serves to bias the retaining and trip lever to the position wherein it retains the gripper control lever in its down or inactive position. With the gripper control lever down, as shown by the full lines of Fig. 1 and in Fig. 3, the tooth on trip lever 25 engages lug 22 and the gripper is held open. However, by merely pressing forward on thumb piece 27, trip lever 25 is swung to disengage tooth 28 from lug 22 and spring 20 rotates the gripper control handle into the gripping position shown by the dotted lines of Fig. 1 and the binder is anchored.

The motor drives the binder tensioning windlass through speed reduction gearing and an adjustable clutch which will now be described.

Motor shaft 35 has a pinion 36 keyed thereto. Pinion 36, through suitable speed reducing gears 37, drives a clutch shaft 38 which is journaled in the head frame. Clutch shaft 38 has a mandrel 39 keyed thereto and loosely carries a tubular clutch barrel 40 which is journaled for rotation in the head frame. Mandrel 39 has a series of metal driving clutch discs 41 which are longitudinally movable thereon but rotatably fixed with respect thereto. This capability of movement along and rotation with mandrel 39 is effected by providing the mandrel with a series of longitudinal grooves 42 into which project fins 43 extending radially inward from the base of each disc 41. The driving discs are thus, in effect, feathered to mandrel 39. A series of metal driven clutch discs 44 are interposed between driving discs 41, these driven discs being free to move longitudinally of mandrel 39 but rotatably fixed relative to clutch barrel 40. This capability of movement along and rotation with clutch barrel 40 is effected by providing the barrel with a series of longitudinal grooves 45 in its bore into which project fins 46 extending radially outward from the periphery of each disc 44. Thus the driven clutch discs are, in effect, feathered to clutch barrel 40.

The driving and driven discs of the clutch are held in predetermined and adjustable contact with each other by a clutch spring 50. The train of discs abuts at one end against an annular shoulder 51 of mandrel 39 and is engaged at the opposite end by one end of spring 50. The outer end of spring 50 abuts against the end of an elongated tubular pressure adjusting nut 52. This nut 52 is externally threaded to fit internal threads on clutch barrel 40 so that it may, by rotation, be moved in and out relative to the clutch discs and thereby vary the pressure—and consequently the driving friction—between them. Thus, turning the adjusting nut in one direction relative to the clutch barrel increases the friction within the clutch, thereby increasing the tension which can be attained before the clutch will slip; turning the adjusting nut in the opposite direction decreases the friction within the clutch and thereby decreases the tension which can be attained before the clutch will slip.

In order to prevent any tension adjustment from being accidentally disturbed and to permit the tension adjusting nut to be used to turn the windlass when desired, means are provided detachably to lock nut 52 relative to the clutch barrel. These means include a lock ring 53 which loosely encircles nut 52 and is provided with studs 54 which project from the rear face thereof and also inwardly from the wall of the bore therethrough. The rearwardly projecting parts of these studs 54 are adapted to enter notches 55 in the front end of clutch barrel 40 and thereby lock the ring and clutch barrel against relative rotation. The inwardly projecting parts of the studs 54 are seated in longitudinal grooves 56 in the periphery of the shank of nut 52, so that the nut and locking ring rotate together. A light coiled spring 57, which bears against the head of nut 52 at one end and locking ring 53 at the other end, biases the locking ring to its locking position. In order to adjust the clutch to secure the desired tension the locking ring 53 is moved outwardly against the force of spring 57 until the studs 54 clear notches 55 and then adjusting nut 52 is turned relative to the clutch barrel to increase or decrease the pressure between the clutch discs as required. With the locking ring against the end of the clutch barrel and studs 54 lying in the notches 55 thereof the rotation of nut 52 rotates the clutch barrel and the windlass, as will be presently explained.

Clutch barrel 40 has a pinion 60 keyed thereto. This pinion 60 meshes with a pinion 61 which is keyed to a worm shaft 62 provided with a worm 63. Worm 63 meshes with a pinion 64 keyed to a windlass shaft 65 which carries the windlass E. Worm shaft 63 is journaled in the head frame and is provided at the end in the direction of the worm thrust with a ball bearing 66, which serves both as a thrust and friction reducing bearing. The bearing at the opposite end of the worm shaft is provided by a socket in a removable cover plate 67 for a suitable assembly opening in the head frame. The socket is shown equipped with a hardened bearing ring 68.

The windlass shaft 65 is retained in position by the worm pinion 64 engaging an annular shoulder 69 of the head frame and by a pin 70 which projects through a hole in the head frame into an annular groove 71 in the windlass shaft. The opening for pin 71 together with a worm gear assembly opening in the head frame are covered by a plate 72. Pin 70 may be internally threaded at one end, as shown, to facilitate its removal by a threaded instrument should it become necessary to remove the windlass shaft. A diaphragm 73 bridging the opening between the switch box of the handle and the chamber of the head frame serves to separate these two cavities and prevent oil from the gearing and clutch reaching the switch contacts. The diaphragm also facilitates fitting the handle upon the head, making it unnecessary to fit the castings together tightly. A depending leg 74 may be provided below the motor to assist in supporting the tool firmly in upright position.

In operation the binder 80, which preferably is precut to the necessary length, is looped about the package or group of packages 81 and loosely held in position by one hand. With the other hand grasping handle grip 7 the tool is then placed upon the package and, with the gripper control lever down to open the gripper, one end of the binder is interposed between foot 15 and gripper block 16. Then, with the thumb of the hand grasping the tool, trip lever 25 is moved to release the gripper without interfering with the holding and manipulation of the binder by the other hand. The free end of the binder is then passed through one of the slots of the windlass and, with the fore finger of the hand grasping the handle, trigger 12 is raised. The motor starts and the binder is wound upon the periphery of the windlass to effect its tensioning or stretching.

When the binder is tensioned to the amount for which the tool has been set the clutch slips and rotation of the windlass ceases. The pitch of the worm is such that the reverse pull of the binder under tension cannot reverse the rotation of the windlass to release the tension established when the clutch slips. If, however, it is desired to slightly release the binder tension—for example, to facilitate removal of the binder from the windlass—reverse rotation may be effected by rotating the tension adjusting nut while it is locked to the clutch barrel. In order to vary the tension at which the clutch will slip the adjusting nut 52 is unlocked from the clutch barrel by retracting locking ring 53 and then relatively rotating the nut and clutch barrel to thread the former in or out to increase or decrease the pressure exerted by spring 50 tending to force the clutch discs together.

Having thus illustrated the nature and one embodiment of my invention, what I claim and desire to secure by United States Letters Patent is as follows:

1. A portable stretching tool comprising a frame having a handle whereby the tool is adapted to be carried and held manually during operation, a motor carried by the frame, a rotatable windlass journaled in the frame for receiving and exerting a pull upon one end of a binder, driving connections between the motor and windlass, a gripper carried by the frame for anchoring the other end of the binder, and control mechanism for said motor and said gripper near said handle and adapted to be operated by a hand holding said handle.

2. A portable stretching tool having a handle whereby the tool is adapted to be carried and held manually during operation, and having a rotatable windlass for receiving and exerting a pull upon one end of a binder, a gripper for anchoring the other end of the binder, a motor, a driving connection between the motor and the windlass, said connection including a clutch which slips to interrupt the drive when the binder tension reaches a predetermined amount, and control mechanism for said motor and said gripper near said handle and adapted to be operated by a hand holding said handle.

3. A portable stretching tool having a handle whereby the tool is adapted to be carried and held manually during operation, and having a rotatable windlass for receiving and exerting a pull upon one end of a binder, a gripper movable to a position to clamp and anchor the other end of the binder, said gripper being biased to binder clamping position, releasable means for holding the gripper from binder clamping position extending near the handle and adapted to be operated by a hand holding said handle, and a motor for rotating the windlass.

4. A portable stretching tool having a handle whereby the tool is adapted to be carried and held manually during operation, and having a motor, a rotatable windlass for receiving and exerting a pull upon one end of a binder, a driving connection between the motor and windlass, said connection including a clutch which slips to interrupt the drive when the binder tension reaches a predetermined amount, a gripper movable to a position to anchor the other end of the binder, said gripper being biased to binder anchoring position, and releasable means for holding the gripper from binder anchoring position, said releasable means extending near the handle and being adapted to be operated by a hand holding the handle.

5. A stretching device comprising a frame shaped to form a handle and constitute a housing for a switch, an electric circuit controlling switch in the frame, a trigger for controlling the switch, a rotatable windlass for receiving and exerting a pull upon one end of a binder, a motor, electrical connections between the motor and switch, a driving connection between the motor and the windlass, said driving connection including an adjustable slip clutch which interrupts the drive between the motor and windlass when the binder tension reaches a predetermined amount, a stationary gripper foot on the frame, a movable gripper on the frame, means for moving the movable gripper toward and from the stationary gripper to clamp the other end of a binder therebetween and to afford space for applying a binder therebetween, means biasing the movable gripper toward the stationary gripper, and a trip normally holding the movable gripper away from the stationary gripper but operable from a position near the trigger of the switch to release the movable gripper and permit the same to move toward the stationary gripper.

6. A portable stretching tool comprising a frame having a handle whereby the tool is adapted to be carried and held manually during operation, a motor carried by the frame, a windlass for receiving and exerting a pull upon a binder, a clutch shaft driven by the motor, a plurality of driving clutch discs feathered to said shaft to rotate therewith and have axial movement therealong, a tubular clutch barrel surrounding the driving discs, a plurality of driven clutch discs interposed between the driving discs and feathered to the clutch barrel to rotate the same and have axial movement along said shaft, means for varying the pressure between the driving and driven discs, an operative connection between the clutch barrel and the windlass, and control mechanism near said handle and adapted to be operated by a hand holding the handle.

7. A package binder stretching tool comprising a frame shaped to form a handle for carrying and manipulating the tool and to constitute a housing for a switch, an electric circuit controlling switch in the switch housing, a trigger for controlling the switch, said trigger being adjacent one end of the handle, a motor carried by the frame below the handle, electrical connections between the switch and motor, a clutch shaft mounted within the frame, speed reducing gearing between the motor and clutch shaft, a mandrel fixed to the shaft, a series of driving clutch discs feathered to the mandrel to be longitudinally movable therealong and rotated thereby, a clutch barrel journaled in the frame, a series of driven clutch discs interposed between the driving discs and feathered to the clutch barrel so as to be movable along the mandrel and rotatable with the clutch barrel, a spring for forcing the driving and driven discs together, means for varying the pressure of the spring upon the discs to control the friction therebetween, and a rotatable windlass driven from the clutch barrel, said windlass being adapted to receive and wind thereupon a binder when rotated.

8. A package binder stretching tool comprising a frame shaped to form a handle for carrying and manipulating the tool and to constitute a housing for a switch, an electric circuit controlling switch in the switch housing, a trigger for controlling the switch, said trigger being adjacent one end of the handle, a motor carried by the frame below the handle, electrical connections between the switch and motor, a clutch shaft mounted within the frame, speed reducing gearing between the motor and clutch shaft, a mandrel fixed to the shaft, a series of driving clutch discs feathered to the mandrel to be longitudinally movable therealong and rotated thereby, a clutch barrel journaled in the frame, a series of driven clutch discs interposed between the driving discs and feathered to the clutch barrel so as to be movable along the mandrel and rotatable with the clutch barrel, a spring for forcing the driving and driven discs together, means for varying the pressure of the spring upon the discs to control the friction therebetween, a rotatable windlass carried by the frame and for receiving and exerting a pull upon one end of a binder, a driving connection between the clutch barrel and the windlass, and a gripper for anchoring the other end of the binder.

9. A package binder stretching tool comprising a frame shaped to form a handle for carrying and manipulating the tool and to constitute a housing for a switch, an electric circuit controlling switch in the switch housing, a trigger for controlling the switch, said trigger being adjacent one end of the handle, a motor carried by the frame below the handle, electrical connections between the switch and motor, a clutch shaft mounted within the frame, speed reducing gearing between the motor and clutch shaft, a mandrel fixed to the shaft, a series of driving clutch discs feathered to the mandrel to be longitudinally movable therealong and rotated thereby, a clutch barrel journaled in the frame, a series of driven clutch discs interposed between the driving discs and feathered to the clutch barrel so as to be movable along the mandrel and rotatable with the clutch barrel, a spring for forcing the driving and driven discs together, means for varying the pressure of the spring upon the discs to control the friction therebetween, a rotatable windlass carried by the frame and for receiving and exerting a pull upon one end of a binder, a driving connection between the clutch barrel and the windlass, a gripper for anchoring the other end of the binder, means for biasing the gripper to gripping position, and a trip for releasably holding the gripper out of gripping position.

HOWARD C. PORTER.